United States Patent
Zhu

(10) Patent No.: US 10,992,451 B2
(45) Date of Patent: Apr. 27, 2021

(54) AUDIO AND VIDEO PLAYBACK SYSTEM AND METHOD FOR PLAYING AUDIO DATA APPLIED THERETO

(71) Applicant: MStar Semiconductor, Inc., Hsinchu Hsien (TW)

(72) Inventor: Fu Jun Zhu, Shenzhen (CN)

(73) Assignee: MEDIATEK INC., Hsinchu (TW)

( * ) Notice: Subject to any disclaimer, the term of this patent is extended or adjusted under 35 U.S.C. 154(b) by 32 days.

(21) Appl. No.: 16/180,073

(22) Filed: Nov. 5, 2018

(65) Prior Publication Data

US 2019/0173663 A1 Jun. 6, 2019

(30) Foreign Application Priority Data

Dec. 1, 2017 (CN) .......................... 201711255348.5

(51) Int. Cl.
| | |
|---|---|
| *H04L 7/04* | (2006.01) |
| *H04L 29/06* | (2006.01) |
| *G06F 3/16* | (2006.01) |
| *H04N 21/4363* | (2011.01) |
| *H04N 21/24* | (2011.01) |

(Continued)

(52) U.S. Cl.
CPC .............. *H04L 7/041* (2013.01); *G06F 3/165* (2013.01); *H04L 29/06027* (2013.01); *H04L 65/604* (2013.01); *H04N 21/24* (2013.01); *H04N 21/4307* (2013.01); *H04N 21/4392* (2013.01); *H04N 21/43637* (2013.01); *H04L 2007/045* (2013.01)

(58) Field of Classification Search
CPC .. H04N 5/60; H04N 21/439; H04N 21/44004; H04N 21/4307; H04N 21/43637; G06F 3/165; H04L 29/06027
USPC ........................................................ 709/248
See application file for complete search history.

(56) References Cited

U.S. PATENT DOCUMENTS 8,665,370 B2 * 3/2014 Lin .......................... H04N 5/60
348/515
9,191,699 B2 * 11/2015 Agerbak .......... H04N 21/43615
(Continued)

FOREIGN PATENT DOCUMENTS

| CN | 103338204 A | 10/2013 |
|---|---|---|
| CN | 103841498 A | 6/2014 |

(Continued)

*Primary Examiner* — Tauqir Hussain
(74) *Attorney, Agent, or Firm* — McClure, Qualey & Rodack, LLP

(57) ABSTRACT

An audio and video playback system includes an audio and video playback device having a local audio device, and a secondary audio device. A method for playing audio data includes: allocating a local audio buffer space and a secondary audio buffer space to the local audio device and the secondary audio device, respectively; processing obtained multimedia data to generate local audio data and secondary audio data; writing the local audio data and the secondary audio data to the local audio buffer space and the secondary audio buffer space, respectively; reading the local audio data and the secondary audio data buffered in the local audio buffer space and the secondary audio buffer space to the local audio device and the secondary audio device, to have the local audio device and the secondary audio device play the local audio data and the secondary audio data, respectively.

11 Claims, 9 Drawing Sheets

(51) Int. Cl.
*H04N 21/43* (2011.01)
*H04N 21/439* (2011.01)

(56) References Cited

U.S. PATENT DOCUMENTS

| | | | |
|---|---|---|---|
| 9,817,629 B2 | 11/2017 | Hsieh et al. | |
| 2011/0063503 A1* | 3/2011 | Brand | H04N 21/23424 |
| | | | 348/500 |
| 2012/0063603 A1* | 3/2012 | Evans | H04N 21/6156 |
| | | | 381/17 |
| 2012/0206650 A1* | 8/2012 | Lin | H04N 5/60 |
| | | | 348/515 |
| 2012/0274850 A1* | 11/2012 | Hawkins | H04N 5/04 |
| | | | 348/515 |
| 2013/0336626 A1* | 12/2013 | Cheng | H04N 9/8063 |
| | | | 386/201 |
| 2014/0095965 A1* | 4/2014 | Li | G06F 40/12 |
| | | | 715/203 |
| 2015/0304418 A1* | 10/2015 | Rajapakse | H04L 67/1095 |
| | | | 709/219 |
| 2016/0005439 A1* | 1/2016 | Stark | H04N 21/4307 |
| | | | 386/201 |
| 2016/0098244 A1* | 4/2016 | Hsieh | G06F 3/165 |
| | | | 700/94 |
| 2017/0013305 A1* | 1/2017 | Hawkins | H04N 21/4363 |
| 2017/0181113 A1* | 6/2017 | Keyser-Allen | |
| | | | H04N 21/43615 |
| 2018/0077443 A1* | 3/2018 | Lau | H04N 21/4126 |
| 2018/0146236 A1* | 5/2018 | Iyer | H04N 21/41422 |

FOREIGN PATENT DOCUMENTS

| | | |
|---|---|---|
| CN | 105611381 A | 5/2016 |
| CN | 105898503 A | 8/2016 |
| CN | 106341719 A | 1/2017 |
| TW | 201615032 | 4/2016 |

\* cited by examiner

AUDIO AND VIDEO PLAYBACK SYSTEM AND METHOD FOR PLAYING AUDIO DATA APPLIED THERETO

This application claims the benefit of China application Serial No. 201711255348.5, filed Dec. 1, 2017, the subject matter of which is incorporated herein by reference.

BACKGROUND OF THE INVENTION

Field of the Invention

The invention relates to a technical field of audio playback, and more particularly to an audio and video playback system and a method for playing audio data applied to the audio and video playback system.

Description of the Related Art

With the development of technologies and increasing daily life requirements of people, current audio and visual playback devices such as televisions continue to get smarter and high-end and provide images of ever-increasing resolutions as well as robust audio and video decoding capabilities. However, regarding sound output, two small speakers built in a television are still adopted, in a way that the overall sound effect does not improve much even after sound effect processing.

The use of home theaters allow users to experience a stereo surround scene when watching television. However, purchasing a home theater sound system can be quite costly; further, when using the home theater, an audio playback can be realized only by an external secondary sound system rather than fully utilizing an original sound system of the television.

SUMMARY OF THE INVENTION

One main technical problem to be resolved by the present invention is how to provide an audio and video playback system and a method for playing audio data applied to the audio and video playback system, allowing a local audio device of an audio and video playback device and a secondary audio device to jointly play audio data in multimedia data.

To resolve the above technical problem, the present invention provides a method for playing audio data applied to an audio and video playback system. The audio and video playback system includes an audio and video playback device having a local audio device, and a secondary audio device. The method includes: allocating a local audio buffer space and a secondary audio buffer space to the local audio device and the secondary audio device, respectively; processing obtained multimedia data to generate local audio data and secondary audio data; writing the local audio data and the secondary audio data to the local audio buffer space and the secondary audio buffer space, respectively; reading the local audio data and the secondary audio data buffered in the local audio buffer space and the secondary audio buffer space to the local audio device and the secondary audio device, respectively, to have the local audio device and the secondary audio device play the local audio data and the secondary audio data, respectively.

To resolve the above technical problem, the present invention provides an audio and video playback system. The audio and video playback system includes: an audio and video playback device, playing multimedia data, the audio and video playback device including a local audio device, a processor, a memory and a buffer unit; and a secondary audio device, connected to the audio and video playback device. The memory of the audio and video playback device is stored with an audio device management program. When the audio device management program is executed, the audio and video playback device controls the local audio device and the secondary audio device for a collaborated playback task according to the audio device management program to play the audio data in the multimedia data.

The present invention provides the following effects. Different from the prior art, in the method for playing audio data applied to the audio and video playback system of the present invention, a local audio buffer space and a secondary audio buffer space are allocated to the local audio device and the secondary audio device, respectively, local audio data and secondary audio data generated by processing multimedia data are written to the local audio buffer space and the secondary audio buffer space, respectively, so as to play the local audio data and the secondary audio data by the local audio device and the secondary audio device, respectively. Thus, in the audio and video playback system, the local audio device of the audio and video playback device and the secondary audio device can jointly play audio data in the multimedia data.

The above and other aspects of the invention will become better understood with regard to the following detailed description of the preferred but non-limiting embodiments. The following description is made with reference to the accompanying drawings.

DETAILED DESCRIPTION OF THE INVENTION

Specific details are given in the description below in order to thoroughly understand the present invention. However, the present invention can be implemented by various other methods different from those described below, and a person skilled in the art can make similar arrangements without departing from the spirit of the present invention. Therefore, the present invention is not limited by the embodiments disclosed below.

It should be noted that, a current audio and video playback device such as a smart television usually has capabilities for decoding Dolby digital surround sound and DTS digital surround sound, and is capable of decoding multi-channel pulse code modulation data, such as data of 5.1 channels, i.e., a center channel, front left and right channels, and left and right surround channels, and a subwoofer channel (i.e., Cl, L, R, Ls, Rs and LFE channels). However, due to a limited output capability of a local audio device, for example, a smart television is usually equipped with only two small speakers, the output of only the front left channel and the front right channel can be achieved rather than outputting a multi-path stereo surround sound.

Therefore, when using an audio and video playback device for audio and video playback, an external audio device capable of achieving multi-path output is frequently connected to the audio and video playback device to output audio, so as to realize the effect of stereo surround sound and satisfy user needs. However, purchasing the above external audio device capable of realizing multi-path sound output can be quite costly. In addition, such method of directly using the external audio device for audio output does not fully utilize a local audio device of the audio and video playback device.

In regard to the drawbacks mentioned in the description of the prior art, the present invention provides an audio and video playback system and a method for playing audio data applied to the audio and video playback system. The present invention is described in detail in the embodiments with reference to the accompanying drawings below.

Figure 1:
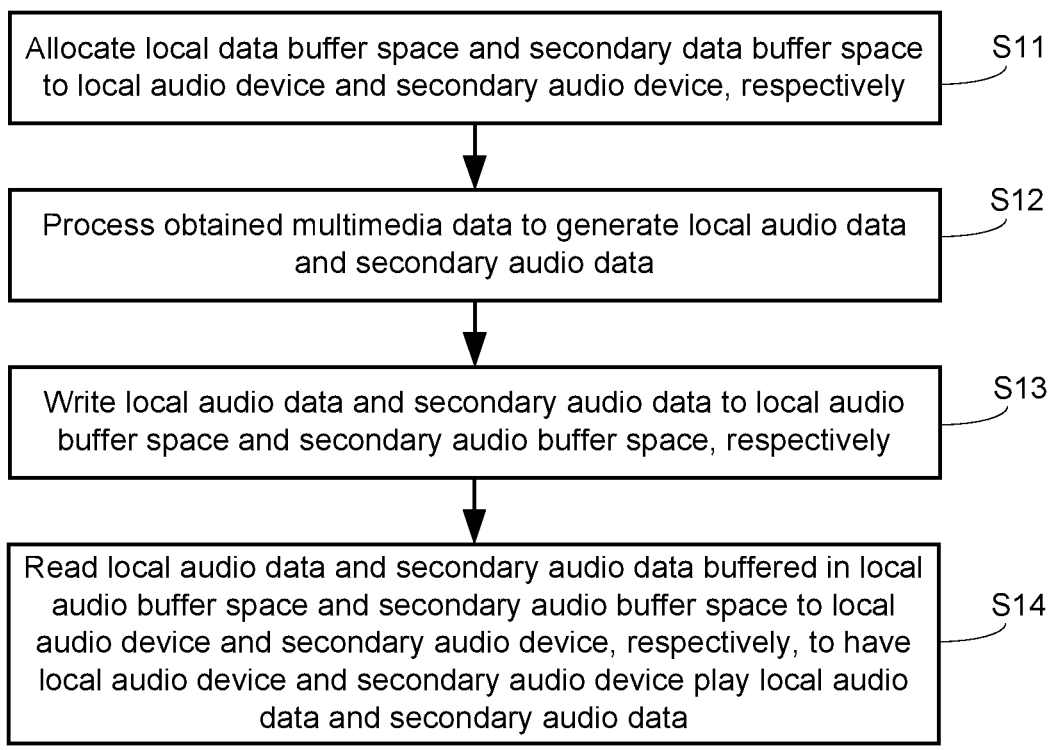
FIG. 1 is a flowchart of a method for playing audio data applied to an audio and video playback system according to an embodiment of the present invention.
Figure 2:
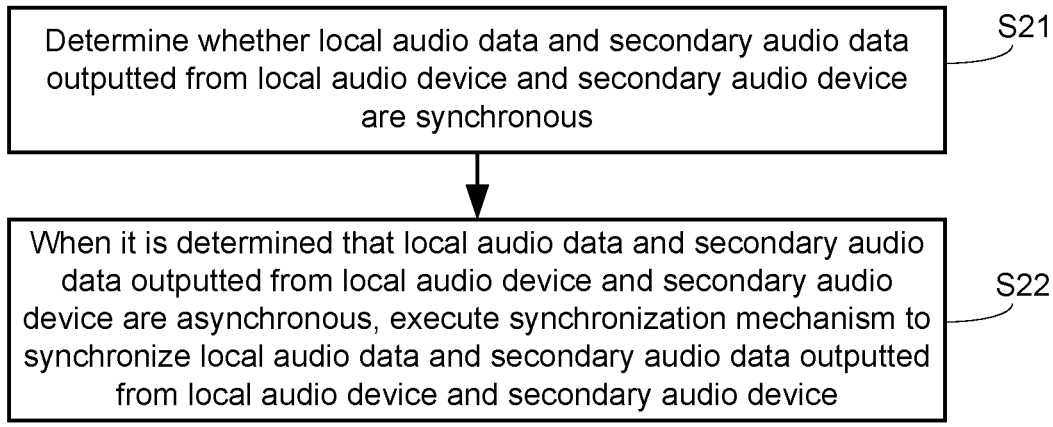
FIG. 2 is a flowchart of a method for playing audio data applied to an audio and video playback system according to another embodiment of the present invention.

FIG. 1 shows a flowchart of a method for playing audio data applied to an audio and video playback system according to an embodiment of the present invention.

In this embodiment, an audio and video playback system is further provided with a secondary audio device on the basis of an audio and video playback device having a local audio device, such that the local audio device and the secondary audio device can collaborate to jointly play corresponding audio data.

The audio and video playback device refers to a device that can play both audio and video, and is, for example, a computer, a cell phone, an in-vehicle computer, a television, or a television system consisting of a set-top box (STB) and a television.

The local audio device is a playback device capable of outputting audio data, and is for example, an acoustic enclosure or a speaker. The local audio device serves as a part of the audio and video playback device and is provided in the audio and video playback device to enable the audio and video playback device to independently play audio.

The secondary audio device is an audio playback device externally connected by a certain means to the audio and video playback device, and is an audio device, for example, an acoustic enclosure or a speaker, capable of independently playing corresponding audio data or playing corresponding audio data together with the local audio device when controlled by an audio playback device. More specifically, the secondary audio device may be connected by a wired or wireless means, e.g., USB wired connection, WiFi connection, 5.4G protocol and Bluetooth connection.

In an application scenario, the audio playback device is a television, or a television system consisting of an STB and a television. The local audio device is a local speaker built in the television, and the secondary audio device is an external acoustic enclosure connected to a television by means of USB wireless connection.

In this embodiment, the audio and video playback device is capable of processing multi-channel audio data, e.g., decoding audio data corresponding to stereophonic, four surround, 5.1 channel or 7.1 channel. The local audio device and the secondary audio device may each be a playback device capable of outputting audio data of one single channel or multiple different channels. For example, the local audio device and the secondary audio device can both output audio data corresponding to one or more channels in 5.1 channel data. More specifically, the two can be complementary so as to output audio data corresponding to all channels of 5.1 channel data.

In one application scenario, the local audio device can output audio data corresponding to the front left and right channels; the secondary audio device is complementary with the local audio device and can output audio data corresponding to the center channel, the left and right surround channels and the subwoofer channel. Thus, with collaborated playback of the two audio devices, the audio and video playback system can completely realize 5.1 channel audio data output.

In this embodiment, the method for playing audio data includes the following steps.

In step S11, a local audio buffer space and a secondary audio buffer space are allocated to the local audio device and the secondary audio device, respectively.

The local audio buffer space is mainly for buffering local audio data that can be outputted by the local audio device, and the secondary audio buffer space is mainly for buffering secondary audio data that can be outputted by the secondary audio device. More specifically, capacities of the local audio buffer space and the secondary audio buffer space can be system-predetermined values, or may be user-defined values according to different playback requirements.

In step S12, obtained multimedia data is processed to generate local audio data and secondary audio data.

The multimedia data is multimedia data including audio data that can be played by the audio and video playback system, e.g., video data including audio, or pure audio data. The audio data in the multimedia data may be multi-channel audio data. Further, the multimedia data may be downloaded from a cloud terminal, a local memory of the audio and video playback device, or acquired on-site.

The local audio data and the secondary audio data are audio data generated from processing the multimedia data by the video and audio playback system. More specifically, the local audio data is audio data that is generated from processing the multimedia data and can be outputted by the local audio device. Correspondingly, the secondary audio data is audio data that is generated from processing the multimedia data and can be outputted by the secondary audio device. For example, when the local audio device can output only audio data corresponding to the front left and right channels, the local audio data may be at least one of audio data corresponding to the front left channel and audio data corresponding to the front right channel.

That is to say, processing the obtained multimedia data to generate the local audio data and the secondary audio data can be processing multi-channel audio data in the obtained multimedia data—the obtained audio data corresponding to the channel that can be outputted by the local audio device is used as the local audio data, and the obtained audio data corresponding to the channel that can be outputted by the secondary audio device is used as the secondary audio data.

In step S13, the local audio data and the secondary audio data are written to the local audio buffer space and the secondary audio buffer space, respectively.

In step S14, the local audio data and the secondary audio data are read from the local audio buffer space and the secondary audio buffer space to the local audio device and the secondary audio device, respectively, to have the local audio device and the secondary audio device play the local audio data and the secondary audio data, respectively.

It should be noted that, the capacities of the local audio buffer space and the secondary audio buffer space are consistent and may be determined according to actual requirements, for example, determined with reference to a speed of writing the audio data and a speed of outputting the audio data, given that a balance between writing and reading the audio data is maintained and the output of the audio data can be smoothly performed.

In this embodiment, the local audio buffer space and the secondary audio buffer space are correspondingly allocated to the local audio device and the secondary audio device, respectively, such that the corresponding local audio data and secondary audio data can be written and buffered, so as to further readily read the corresponding local audio data and secondary audio data to the local audio device and the secondary audio device according to requirements.

In one application scenario, the local audio buffer space and the secondary audio buffer space are respectively ring buffer spaces. More specifically, a first-in-first-out (FIFO) buffer mechanism may be used to respectively buffer the corresponding local audio data and secondary audio data. Thus, while reading the local audio data and the secondary audio data buffered in the local audio buffer space and the secondary audio buffer space to the local audio device and the secondary audio device, more local audio data and secondary audio data can be further written to the local audio buffer space and the secondary audio buffer space, respectively.

In one embodiment, a method for playing audio data applied to an audio and video playback system according to an embodiment of the present invention further includes the following.

In step S21, it is determined whether the local audio data and the secondary audio data outputted from the local audio device and the secondary audio device are synchronous.

It is understandable that, when the local audio device and the secondary audio device need to simultaneously output audio data corresponding to different channels of the same multimedia data, the sound effect would be poor if the audio of the channels cannot be synchronously outputted. However, for different audio devices, due to delays at output ends and different sample rates, synchronous output of audio can be quite challenging. Thus, before outputting audio, it needs to be determined whether the local audio data and the secondary audio data outputted from the local audio device and the secondary audio device are synchronous, and to timely make adjustment if the local audio data and the secondary audio data are asynchronous.

Figure 3:
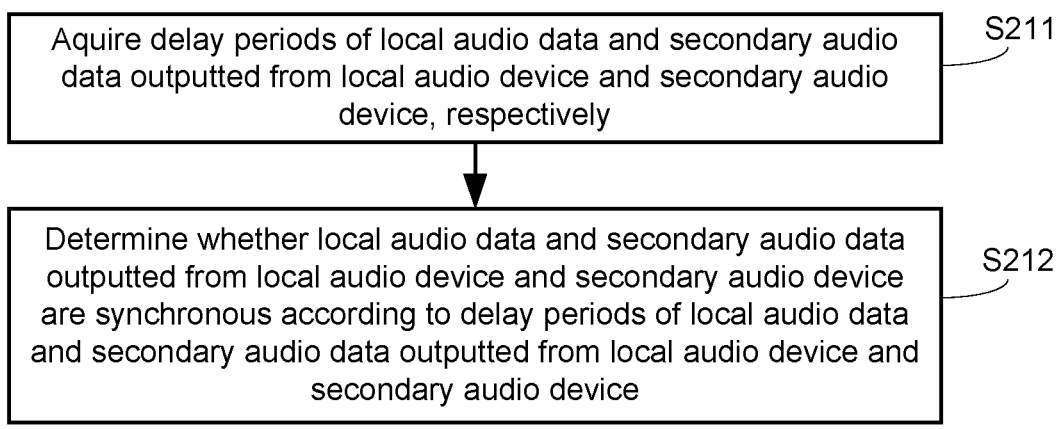
FIG. 3 is a detailed flowchart of step S21 in FIG. 2.

More specifically, referring to FIG. 3, step S21 includes the following.

In sub-step S211, delay periods of the local audio data and the secondary audio data outputted from the local audio device and the secondary audio device are acquired, respectively.

A delay is frequently present at an output end when an audio device outputs audio data, and delay periods at output ends of different audio devices are different, such that audio outputted from different audio devices is asynchronous. For example, for an Android-based smart television, local audio data (e.g., audio data played by speakers built in the television) is processed by executing "AudioHal->tinyalsa->ALSA->DSP->DAC->SPEAKER/HP" by a bottom-layer processing mechanism and outputted, and it is discovered through tests that such processing and outputting processes require a delay period of 74 to 90 ms; audio data (e.g., audio data outputted using a secondary USB audio device connected to the smart television) is processed by executing "AudioHal->tinyalsa-USB ALSA->USB Driver->USB IC process->wireless protocol->speaker" and outputted, and it is discovered through tests that such processing and outputting processes require a delay period of 120 to 150 ms. Thus, when using the audio device or the television and the USB audio device to jointly perform audio output, the audio device of the television having a shorter delay period outputs the audio earlier than the USB audio device having a longer delay period, resulting in asynchronous output between the two. That is to say, because the local audio device and the secondary audio device are different audio devices, outputting audio of different channels cannot be synchronously performed when the two jointly output audio data.

Therefore, delay periods of the local audio data and the secondary audio data outputted from the local audio device and the secondary audio device need to detected, respectively.

When the delay periods of the local audio data and the secondary audio data outputted from the local audio device and the secondary audio device are tested, such delay periods basically cannot be perceived by the human ear. In this embodiment, a delayer can be used for the detection, or software can also be used. For example, the detection is performed by using SIA electroacoustic test software or other means, and is not limited to the above examples.

In sub-step S212, it is determined whether the local audio data and the secondary audio data outputted from the local audio device and the secondary audio device are synchronous according to the delay periods of the local audio data and the secondary audio data outputted from the local audio device and the secondary audio device.

In this embodiment, after the above detection and comparison, when the delay periods between the local audio data and the secondary audio data outputted from the local audio device and the secondary audio device have been detected, it is determined that the local audio data and the secondary audio data outputted from the local audio device and the secondary audio device are synchronous if the two are the same, or differ by within a tolerable difference range. When the two are different by beyond the tolerable range, it is determined that the local audio data and the secondary audio data outputted from the local audio device and the secondary audio device are asynchronous.

In step S22, when it is determined that the local audio data and the secondary audio data outputted from the local audio device and the secondary audio device are asynchronous, a synchronization mechanism is executed to synchronize the local audio data and the secondary audio data outputted from the local audio device and the secondary audio device.

It is understandable that, when the local audio data and the secondary audio data outputted from the local audio device and the secondary audio device are asynchronous, through certain means, the audio device that outputs audio earlier can be delayed by a certain period to output audio, or the audio device that outputs audio later can be brought forward to output audio.

Figure 4:
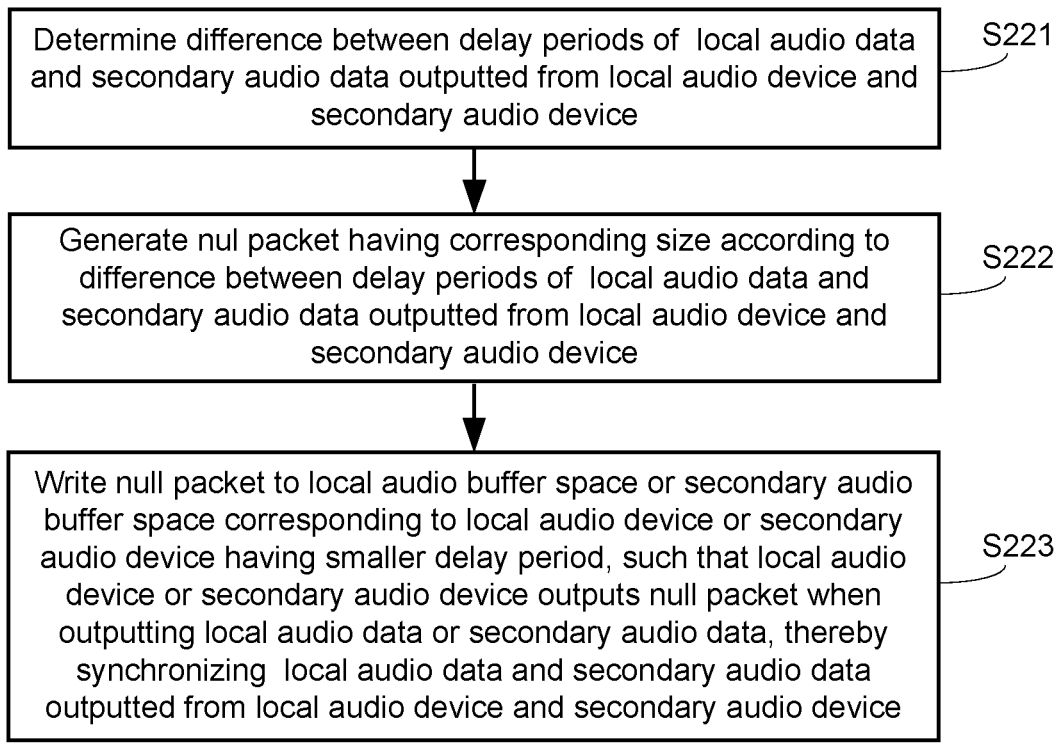
FIG. 4 is a detailed flowchart of step S22 in FIG. 2.

More specifically, in one application scenario, referring to FIG. 4, step S22 includes the following.

In sub-step S221, a difference between the delay periods of the local audio data and the secondary audio data outputted from the local audio device and the secondary audio device is determined.

After the delay periods of the local audio data and the secondary audio data outputted from the local audio device and the secondary audio device are acquired by using a delayer or detection software, the difference between the two delay periods can be determined through simple calculation.

In sub-step S222, a null packets having a corresponding size is generated according to the difference between the delay periods of the local audio data and the secondary audio data outputted from the local audio device and the secondary audio device.

The null packet refers to a packet that does not include any audio data; that is, when the corresponding audio data reads the null packet, no sound is outputted.

Figure 5:
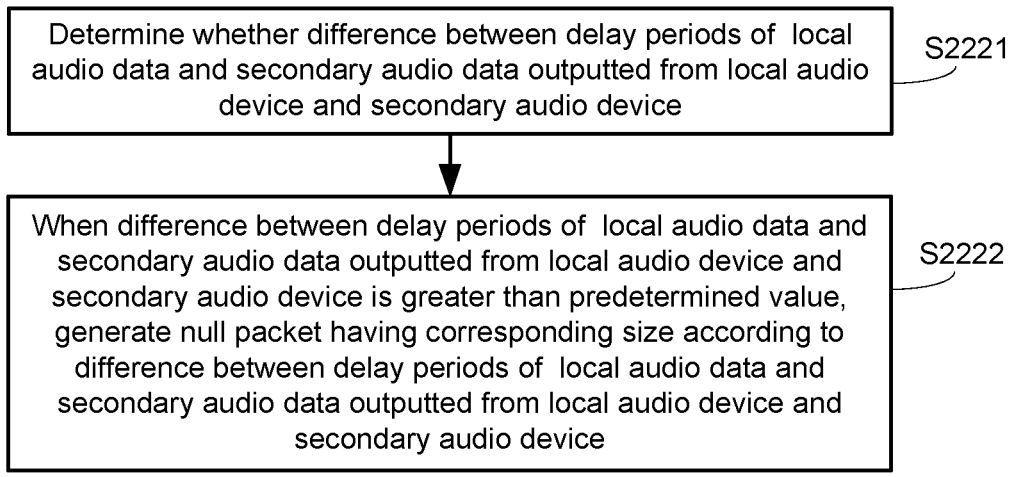
FIG. 5 is a detailed flowchart of step S222 in FIG. 4.

More specifically, in an application scenario, referring to FIG. 5, sub-step S222 further includes sub-steps S2221 and S2222.

In sub-step S2221, it is determined whether the difference between the delay periods of the local audio data and the secondary audio data outputted from the local audio device and the secondary audio device is greater than a predetermined value.

It should be noted that, the predetermined value in this embodiment can be a predetermined time value of the audio and video playback system or a user-defined time value. When the difference between the delay periods of the local audio data and the secondary audio data outputted from the local audio device and the secondary audio device is smaller than the predetermined value, a user cannot perceive a difference caused by the different delay periods between the local audio device and the secondary audio device. However, when the difference between the delay periods of the local audio data and the secondary audio data outputted from the local audio device and the secondary audio device is greater than the predetermined value, a user can perceive the difference caused by the different delay periods between the local audio device and the secondary audio device, which means, at this point, the outputted sound effect is poor and adjustment needs to be made.

In sub-step S2222, when the difference between the delay periods of the local audio data and the secondary audio data outputted from the local audio device and the secondary audio device is greater than the predetermined value, a null packet having a corresponding size is generated according to the difference between the delay periods of the local audio data and the secondary audio data outputted from the local audio device and the secondary audio device.

In this embodiment, the size of the null packet corresponds to the difference between the delay periods of the local audio data and the secondary audio data outputted from the local audio device and the secondary audio device, and more specifically, the time used for outputting the null packet by the audio device is equal to the difference in the delay periods.

In sub-step S223, the null packet is written to the local audio buffer space or the secondary audio buffer space corresponding to the local audio device or the secondary audio device having the smaller delay period, such that the local audio device or the secondary audio device outputs the null packet when outputting the local audio data or the secondary audio data, thus synchronizing the local audio data and the secondary audio data outputted from the local audio device and the secondary audio device.

After acquiring the delay periods of the local audio data and the secondary audio data outputted from the local audio device and the secondary audio device, the audio device corresponding to the smaller delay period and the corresponding difference in the delay periods can be obtained.

As described, the size of the null packet corresponds to the difference in the delay periods. Thus, when the corresponding local audio data and secondary audio data are respectively read by the local audio device and the secondary audio device, the null packet can be outputted at a front-end of the audio device having the smaller delay period. As such, when the time that the audio device having the smaller delay period uses to output the null packet is equal to the corresponding difference in the delay periods, the local audio device and the secondary audio device can simultaneously start outputting the corresponding local audio data and secondary audio data after the null packet is outputted from the audio device having the smaller delay period, thereby achieving synchronous output of the local audio data and the secondary audio data from the local audio device and the secondary audio device.

In an application scenario, the audio and video playback device is a television, the local audio device is a built-in speaker, and the secondary audio device is an acoustic enclosure connected by means of USB wireless connection. Assume that the sound of the television speaker measured using an instrument by a user is 30 ms ahead, and cannot be synchronously outputted with the sound of a USB speaker. At this point, the delay period of the television speaker is set to 30 ms; in an execution thread written in the television speaker, a data amount is calculated according to a sample rate, sound channels, a bit rate and a delay period of the television speaker when the delay period of the television speaker is not equal to zero, and null data having the data amount is filled in a ring buffer space of the television speaker. Thus, the ring buffer space of the television speaker has a data amount of 30 ms more than that in the ring buffer space of the USB speaker, the sound is continuous, the speed of writing the corresponding audio data is constant, and the television speaker then buffers the data in the ring buffer space. As a result, the sound of the television speaker is delayed before being outputted, and is kept synchronous with the sound of the USB speaker.

Figure 6:
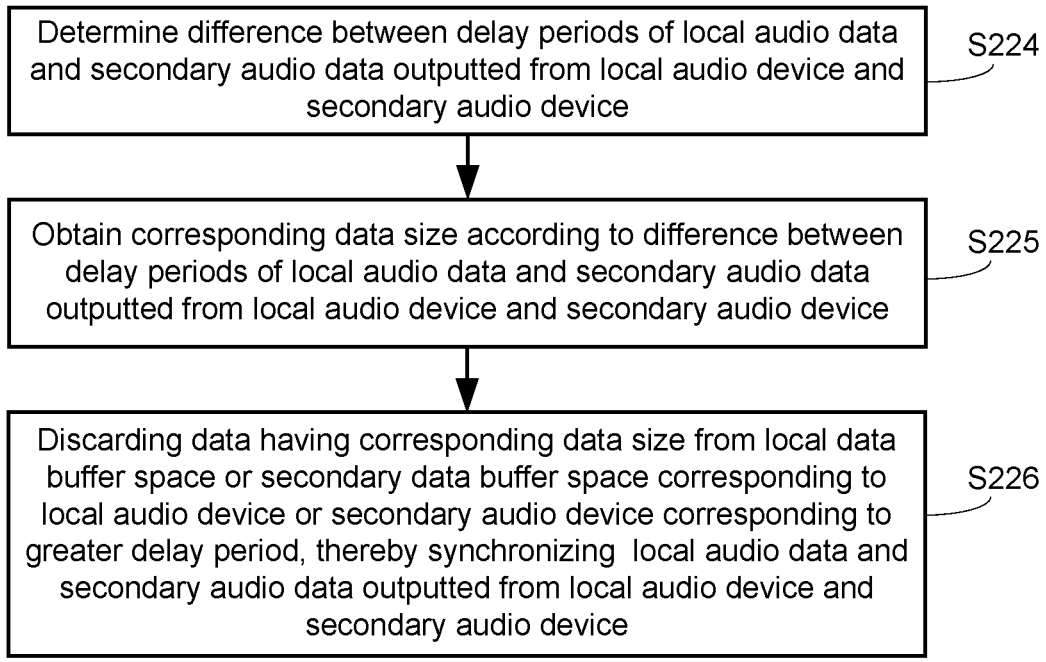
FIG. 6 is a detailed flowchart of step S22 in FIG. 2.

In another application scenario, referring to FIG. 6, step S22 includes the following.

In sub-step S224, a difference between the delay periods of the local audio data and the secondary audio data outputted from the local audio device and the secondary audio device is determined.

In sub-step S225, a corresponding data size is obtained according to the difference between the delay periods of the local audio data and the secondary audio data outputted from the local audio device and the secondary audio device.

Other details of this application scenario are similar to the previous application scenario, and can be referred from the description associated with the previous scenario and are thus omitted herein.

Meanwhile, the corresponding data size obtained is similar to the size of the null packet; the corresponding data size may be correspondingly equal to the difference between the delay periods, and may be correspondingly smaller than or equal to a difference between the difference of the delay times and the above predetermined value.

Figure 7:
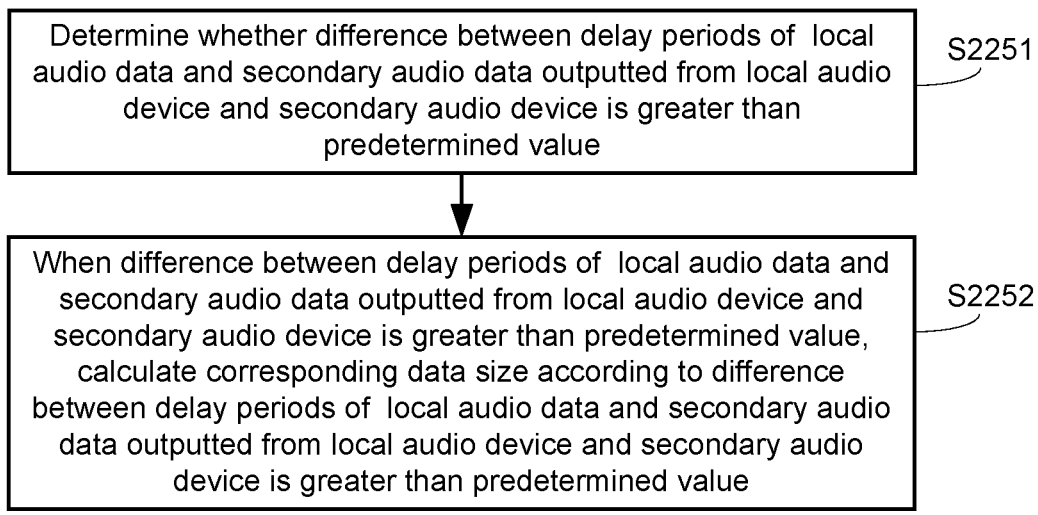
FIG. 7 is a detailed flowchart of step S225 in FIG. 6.

More specifically, in an application scenario, referring to FIG. 7, sub-step S225 further includes sub-steps S2251 and S2252.

In sub-step S2251, it is determined whether a difference between the delay periods of the local audio data and the secondary audio data outputted from the local audio device and the secondary audio device is greater than a predetermined value.

In sub-step S2252, when the difference between the time periods of the local audio data and the secondary audio data outputted from the local audio device and the secondary audio device is greater than the predetermined value, a corresponding data size is calculated and obtained according to the difference between the delay periods of the local audio data and the secondary audio data outputted from the local audio device and the secondary audio device.

Similarly, details of the sub-step S225 can be referred from the description associated with the previous application scenario, and are omitted herein.

In sub-step S226, data having a corresponding data size is discarded from the local audio buffer space or secondary audio buffer space corresponding to the local audio device or the secondary audio device having a greater delay period, so as to synchronize the local audio data and the secondary audio data outputted from the local audio device and the secondary audio device.

As described, the data size obtained corresponds to the difference in the delay periods. Thus, when the corresponding local audio data and secondary audio data are respectively read by the local audio device and the secondary audio device, data corresponding to the above data size can be discarded from a front part of the local audio data or the secondary audio data corresponding to the local audio device or the secondary audio device having a greater delay period, i.e., the data at the front part is not outputted from the corresponding audio device. As such, the time used by the audio device to output the part of discarded data is correspondingly equal to the difference in the delay periods, the audio device having a greater delay period can catch up in reading the audio data corresponding to the audio device having a smaller delay period after discarding the part of the data, and the local audio device and the secondary audio device can then simultaneously start to read the corresponding local audio data and secondary audio data from the data following the discarded data, thereby synchronizing the local audio data and the secondary audio data outputted from the local audio device and the secondary audio device.

In an application scenario, the audio and video playback device is a television, the local audio device is a built-in speaker, and the secondary audio device is an acoustic enclosure connected by means of USB wireless connection. Although the USB acoustic enclosure provides a sample rate of 48 KHz, the actual hardware output is approximately 47.98 KHz. It is discovered through tests by a user that, after the outputs of the television speaker and the USB acoustic enclosure are synchronized and a source is played continuously for 30 minutes, asynchronization again occurs. More specifically, the audio output from the television speaker is faster than the audio output from the USB acoustic enclosure by 50 ms, and such difference increases as the playback continues, resulting in significant synchronization discrepancy. At this point, after detection, it is concluded that the data size of data buffered in the ring buffer space can skip the playback time of the device, and the 50 ms data is directly discarded and not outputted. Although the sound may sound a little paused, such issue cannot be easily perceived by a user because the surround sound of the audio outputted from the USB acoustic enclosure is not the main sound. Thus, synchronous output of the local audio data and the secondary audio data from the local audio device and the secondary audio device is achieved.

With the above method, a local audio buffer space and a secondary audio buffer space are respectively allocated to the local audio device and the secondary audio device. When the local audio data and the secondary audio data outputted from the local audio device and the secondary audio device are asynchronous, a null packet can be written to the local audio buffer space or the secondary audio buffer space corresponding to the local audio device or the secondary audio device having a smaller delay period, or data having a corresponding data size is discarded from the local audio buffer space or the secondary audio buffer space corresponding to the local audio device or the secondary audio device having a greater delay period, thereby synchronizing the local audio data and the secondary audio data outputted from the local audio device and the secondary audio device. Meanwhile, in contribution of the collaboration of the local audio device and the secondary audio device, the processed multimedia data is outputted through multiple channels, thus achieving a stereo surround sound effect. Further, in this embodiment, the local audio device of the audio and video playback device is fully utilized without having to entirely depend on an external secondary audio device, hence significantly reducing utilization costs.

Figure 8:
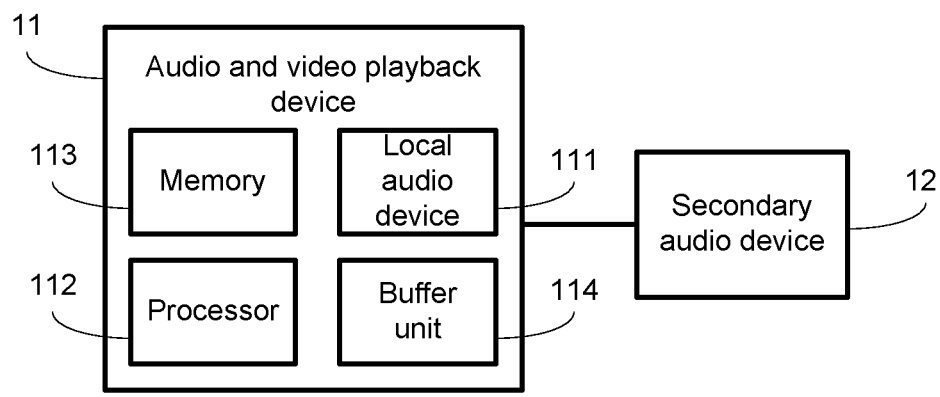
FIG. 8 is a schematic diagram of a frame of an audio and video playback system according to an embodiment of the present invention.

FIG. 8 shows a schematic diagram of a frame of an audio and video playback system according to an embodiment of the present invention. The audio and video playback system includes an audio video playback device 11 and a secondary audio device 12.

The audio and video playback device 11 is for playing multimedia data, and includes a local audio device 111, a processor 112, a memory 113 and a buffer unit 114. The secondary audio device 12 is connected to the audio and video playback device 11.

In an application scenario, the audio and video playback device 11 is a television or a television system consisting of an STB and a television, the local audio device 11 is a local speaker built-in the television, and the secondary audio device 12 and the television are connected by means of USB wireless connection.

The memory 113 of the audio and video playback device 11 is stored with an audio device management program. When the audio device management program is executed by the processor 112, the audio and video playback device 11 controls the local audio device and the secondary audio device for a collaborated playback task according to the audio device management program to play the audio data in the multimedia data.

In addition, the audio device management program further includes an audio device playback mode selection function. When the audio device playback mode selection function is performed, the audio and video playback device 11 drives the local audio device 111 and/or the secondary audio device 12 according to the selected audio device playback mode to play the audio data in the multimedia data.

That is to say, in this embodiment, the audio and video playback system can drive only the local audio device 11 to play the audio data in the multimedia data, drive only the secondary audio device 12 for playback, and simultaneously drive the local audio device 111 and the secondary audio device 12 for collaborated playback.

More specifically, other details of the audio and video playback device 11, the local audio device 111 and the secondary audio device 12 are similar to those in the foregoing description associated with the method for playing the audio data applied to an audio and video playback system of the present invention, and can be referred from the above embodiments and are thus omitted herein.

Figure 9:
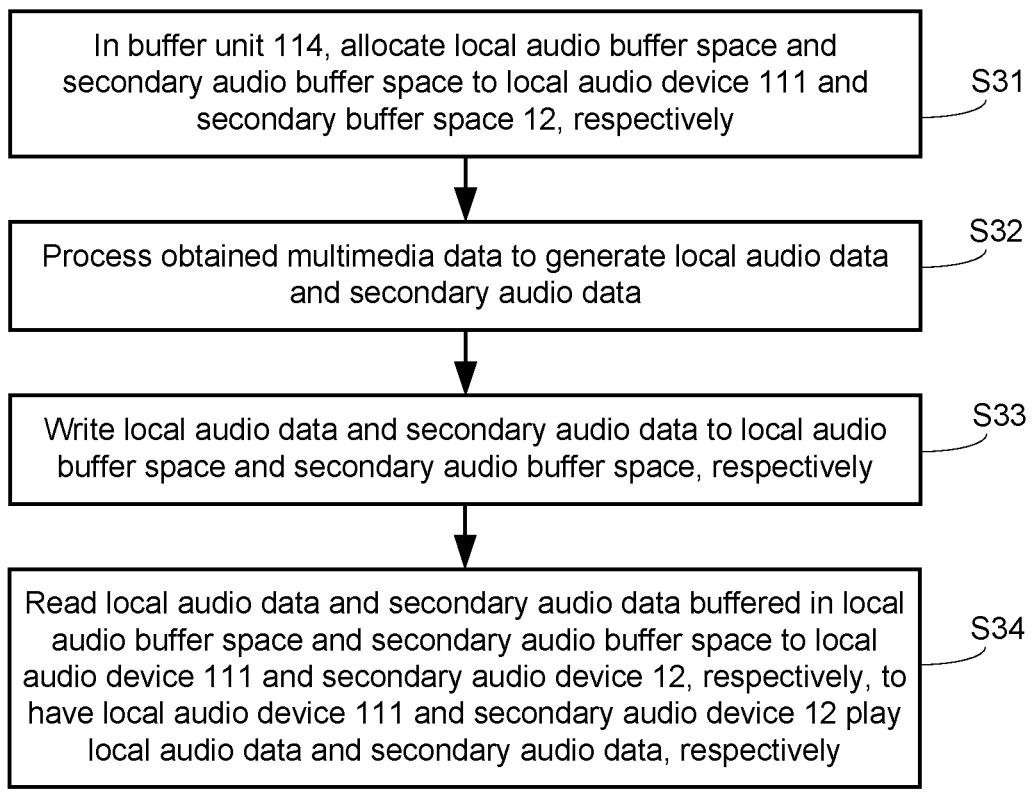
FIG. 9 is a flowchart of steps performed by a processor 112 of an audio playback device 11 in an audio and video playback system according to an embodiment of the present invention.

In one embodiment, referring to FIG. 9, when the audio and video playback device 11 controls the local audio device 111 and the secondary audio device 12 according to the audio device management program to collaboratively play the audio data in the multimedia data, the processor 112 in the audio and video playback device 11 performs the following.

In step S31, from the buffer unit 114, a local audio buffer space and a secondary audio buffer space are allocated to the local audio device 111 and the secondary audio device 12, respectively.

In step S32, obtained multimedia data is processed to generate local audio data and secondary audio data.

In step S33, the local audio data and the secondary audio data are written to the local audio buffer space and the secondary audio buffer space, respectively.

In step S34, the local audio data and the secondary audio data buffered in the local audio buffer space and the secondary audio buffer space are read to the local audio device 111 and the secondary audio device 12, respectively, to have the local audio device 111 and the secondary audio device 12 play the local audio data and the secondary audio data, respectively.

In one embodiment, the local audio buffer space and the secondary audio buffer space are respectively ring buffer spaces. More specifically, a first-in-first-out (FIFO) buffer mechanism may be used to respectively buffer the local audio data and the secondary audio data. Thus, while reading the local audio data and the secondary audio data buffered in the local audio buffer space and the secondary audio buffer space to the local audio device 111 and the secondary audio device 12, more local audio data and secondary audio data can be further written to the local audio buffer space and the secondary audio buffer space, respectively.

Figure 10:
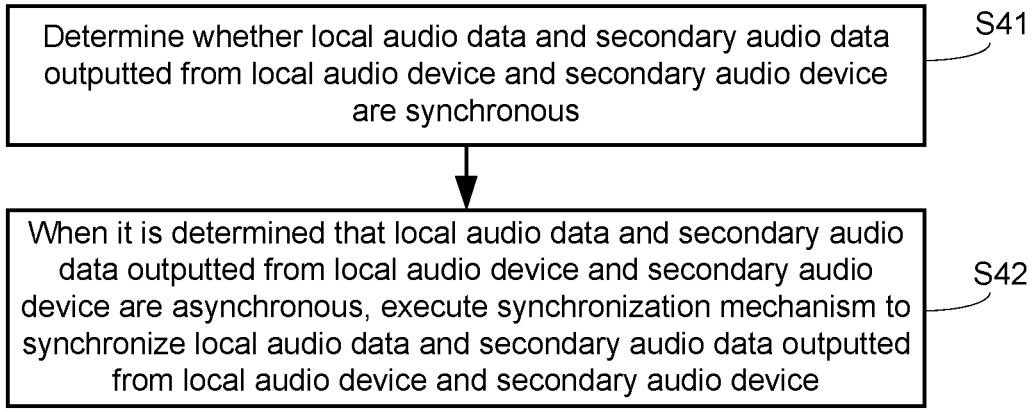
FIG. 10 is a flowchart of steps performed by a processor 112 of an audio playback device 11 in an audio and video playback system according to an embodiment of the present invention.

Referring to FIG. 10, in one embodiment, when the audio and video playback device 11 controls the local audio device 111 and the secondary audio device 12 to collaboratively play the audio data in the multimedia data, the processor 112 further performs the following.

In step S41, it is determined whether the local audio data and the secondary audio data outputted from the local audio device 111 and the secondary audio device 12 are synchronous.

In step S42, when it is determined that the local audio data and the secondary audio data outputted from the local audio device 111 and the secondary audio device 12 are asynchronous, a synchronization mechanism is executed to synchronize the local audio data and the secondary audio data outputted from the local audio device 111 and the secondary audio device 12.

Figure 11:
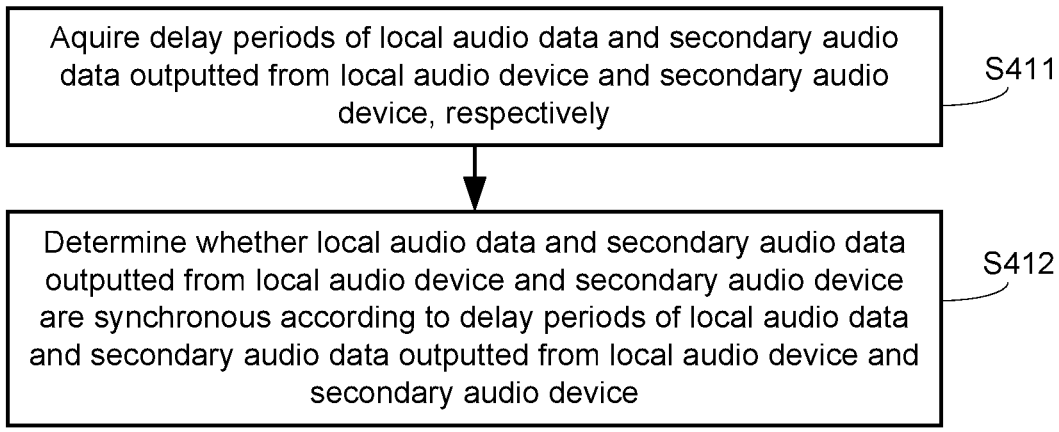
FIG. 11 is a detailed flowchart of step S41 in FIG. 10 and performed by the processor 112.

Referring to FIG. 11, in one embodiment, step S41 further comprises the following.

In step S411, delay periods of the local audio data and the secondary audio data outputted from the local audio device 111 and the secondary audio device 12 are acquired, respectively.

In step S412, according to the respective delay periods of the local audio data and the secondary audio data outputted from the local audio device 111 and the secondary audio device 12, it is determined whether the local audio data and the secondary audio data outputted from the local audio device 111 and the secondary audio device 12 are synchronous.

Figure 12:
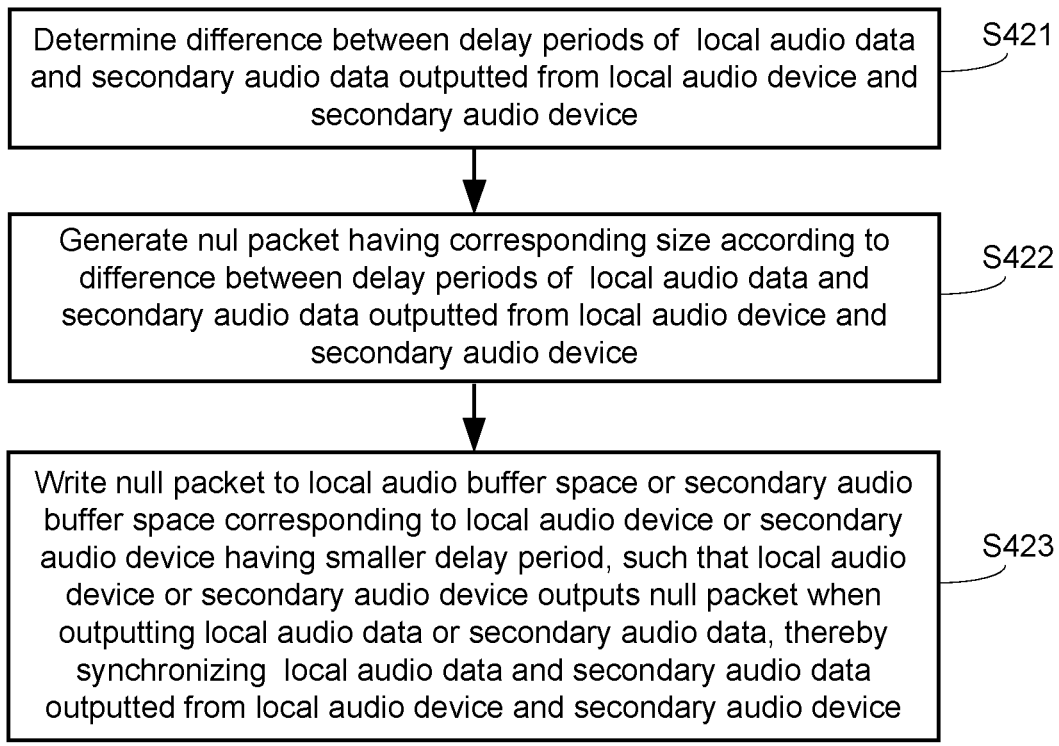
FIG. 12 is a detailed flowchart of step S42 in FIG. 10 and performed by the processor 112.

Referring to FIG. 12, in one embodiment, step S42 further includes the following.

In step S421, a difference between the delay periods of the local audio data and the secondary audio data outputted from the local audio device 111 and the secondary audio device 12 is determined.

In step S422, a null packet having a corresponding size is generated according to the difference between the delay periods of the local audio data and the secondary audio data outputted from the local audio device 111 and the secondary audio device 12.

In step S423, the null packet is written to the local audio buffer space or the secondary audio buffer space corresponding to the local audio device 111 or the secondary audio device 12 having a smaller delay period, such that the local audio device 111 or the secondary audio device 12 outputs the null packet when outputting the local audio data or the secondary audio data, thereby synchronizing the local audio data and the secondary audio data outputted from the local audio device 111 and the secondary audio device 12.

Figure 13:
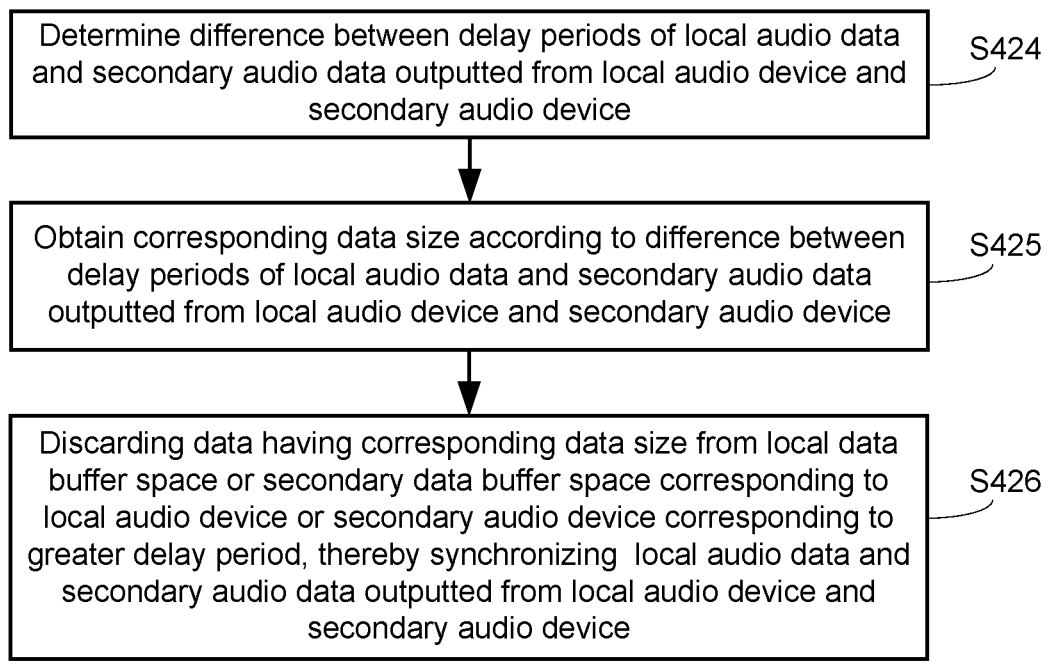
FIG. 13 is a detailed flowchart of step S42 in FIG. 10 and performed by the processor 112.

Referring to FIG. 13, in one embodiment, step S42 further includes the following.

In step S424, a difference between the delay periods of the local audio data and the secondary audio data outputted from the local audio device 111 and the secondary audio device 12 is determined.

In step S425, a corresponding data size is obtained according to the difference between the delay periods of the local audio data and the secondary audio data outputted from the local audio device 111 and the secondary audio device 12.

In step S426, data having the corresponding data size is discarded from the local audio buffer space or the secondary audio buffer space corresponding to the local audio device 111 or the secondary audio device 12, thereby synchronizing the local audio data and the secondary audio data outputted from the local audio device 111 and the secondary audio device 12.

Similarly, in the audio and video playback system according to this embodiment, the steps performed by the audio and video playback system are similar to the foregoing method for playing audio data applied to an audio and video playback system of the present invention, and associated details can be referred from the description of the above embodiments and are omitted herein.

With the above method, a local audio buffer space and a secondary audio buffer space are respectively allocated to the local audio device 111 and the secondary audio device 12. When the local audio data and the secondary audio data outputted from the local audio device 111 and the secondary audio device 12 are asynchronous, a null packet is written to the local audio buffer space or the secondary audio buffer space corresponding to the local audio device 111 or the secondary audio device 12 having a smaller delay period, or data having a corresponding data size is discarded from the local audio buffer space or the secondary audio buffer space corresponding to the local audio device 111 or the secondary audio device 12 having a greater delay period, thereby synchronizing the local audio data and the secondary audio data outputted from the local audio device 111 and the secondary audio device 12. Meanwhile, in contribution of the collaboration of the local audio device 111 and the secondary audio device 12, the processed multimedia data is outputted through multiple channels, thus achieving a stereo surround sound effect. Further, in this embodiment, the local audio device 111 of the audio and video playback device 11 is fully utilized without having to entirely depend on an external secondary audio device 12, hence significantly reducing utilization costs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A method for playing audio data, the method applied to an audio and video playback system, the audio and video playback system comprising a secondary audio device and an audio and video playback device having a local audio device, wherein the audio and video playback device plays both audio and video, the method comprising:
    allocating a local audio buffer space and a secondary audio buffer space to the local audio device and the secondary audio device, respectively;
    processing obtained multimedia data to generate local audio data and secondary audio data;
    writing the local audio data and the secondary audio data to the local audio buffer space and the secondary audio buffer space, respectively, wherein the local audio data and the secondary audio data are not the same;
    reading the local audio data and the secondary audio data buffered in the local audio buffer space and the secondary audio buffer space to the local audio device and the secondary audio device, respectively, to have the local audio device and the secondary audio device simultaneously play the local audio data and the secondary audio data, respectively,
    wherein the local audio buffer space and the secondary audio buffer space are each a ring buffer space, such that while the local audio data and the secondary audio data buffered in the local audio buffer space and the secondary audio buffer space are read to the local audio device and the secondary audio device, the local audio data and the secondary audio data are continuously further written to the local audio buffer space and the secondary audio buffer space, respectively; and
    determining whether the local audio data and the secondary audio data outputted from the local audio device and the secondary audio device are synchronous;
    when it is determined that the local audio data and the secondary audio data outputted from the local audio device and the secondary audio device are asynchronous, executing a synchronization mechanism to synchronize the local audio data and the secondary audio data outputted from the local audio device and the secondary audio device are synchronous;
    wherein the step of determining whether the local audio data and the secondary audio data outputted from the local audio device and the secondary audio device are synchronous further comprises:
        acquiring delay periods of the local audio data and the secondary audio data outputted from the local audio device and the secondary audio device, respectively; and
        determining, according to the respective delay periods of the local audio data and the secondary audio data outputted from the local audio device and the secondary audio device, whether the local audio data and the secondary audio data outputted from the local audio device and the secondary audio device are synchronous;
    wherein the step of executing the synchronization mechanism to synchronize the local audio data and the secondary audio data outputted from the local audio device and the secondary audio device further comprises:
        determining a difference between the delay periods of the local audio data and the secondary audio data outputted from the local audio device and the secondary audio device;
        generating a null packet having a corresponding size according to the difference between the delay periods of the local audio data and the secondary audio data outputted from the local audio device and the secondary audio device; and
        writing the null packet to the local audio buffer space or the secondary audio buffer space corresponding to the local audio device or the secondary audio device having the smaller delay period, to cause the local audio device or the secondary audio device to output the null packet when outputting the local audio data or the secondary audio data, thereby synchronizing the local audio data and the secondary audio data outputted from the local audio device and the secondary audio device.

2. The method according to claim 1, wherein the step of generating the null packet having the corresponding size according to the difference between the delay periods of the local audio data and the secondary audio data outputted from the local audio device and the secondary audio device comprises:
    determining whether the difference between the delay periods of the local audio data and the secondary audio data outputted from the local audio device and the secondary audio device is greater than a predetermined value; and
    when the difference between the delay periods of the local audio data and the secondary audio data outputted from the local audio device and the secondary audio device is greater than the predetermined value, generating the null packet having the corresponding size according to the difference between the delay periods of the local audio data and the secondary audio data outputted from the local audio device and the secondary audio device.

3. A method for playing audio data, the method applied to an audio and video playback system, the audio and video playback system comprising a secondary audio device and an audio and video playback device having a local audio device, wherein the audio and video playback device plays both audio and video, the method comprising:
    allocating a local audio buffer space and a secondary audio buffer space to the local audio device and the secondary audio device, respectively;
    processing obtained multimedia data to generate local audio data and secondary audio data;
    writing the local audio data and the secondary audio data to the local audio buffer space and the secondary audio buffer space, respectively, wherein the local audio data and the secondary audio data are not the same;
    reading the local audio data and the secondary audio data buffered in the local audio buffer space and the secondary audio buffer space to the local audio device and the secondary audio device, respectively, to have the local audio device and the secondary audio device simultaneously play the local audio data and the secondary audio data, respectively;

wherein the local audio buffer space and the secondary audio buffer space are each a ring buffer space, such that while the local audio data and the secondary audio data buffered in the local audio buffer space and the secondary audio buffer space are read to the local audio device and the secondary audio device, the local audio data and the secondary audio data are continuously further written to the local audio buffer space and the secondary audio buffer space, respectively; and determining whether the local audio data and the secondary audio data outputted from the local audio device and the secondary audio device are synchronous;

when it is determined that the local audio data and the secondary audio data outputted from the local audio device and the secondary audio device are asynchronous, executing a synchronization mechanism to synchronize the local audio data and the secondary audio data outputted from the local audio device and the secondary audio device are synchronous;

wherein the step of determining whether the local audio data and the secondary audio data outputted from the local audio device and the secondary audio device are synchronous further comprises:

acquiring delay periods of the local audio data and the secondary audio data outputted from the local audio device and the secondary audio device, respectively; and determining, according to the respective delay periods of the local audio data and the secondary audio data outputted from the local audio device and the secondary audio device, whether the local audio data and the secondary audio data outputted from the local audio device and the secondary audio device are synchronous, wherein the step of executing the synchronization mechanism to synchronize the local audio data and the secondary audio data outputted from the local audio device and the secondary audio device further comprises:

determining a difference between the delay periods of the local audio data and the secondary audio data outputted from the local audio device and the secondary audio device;

obtaining a corresponding data size according to the difference between the delay periods of the local audio data and the secondary audio data outputted from the local audio device and the secondary audio device; and discarding data having the corresponding data size from the local audio buffer space or the secondary audio buffer space corresponding to the local audio device or the secondary audio device having the greater delay period, thereby synchronizing the local audio data and the secondary audio data outputted from the local audio device and the secondary audio device.

4. The method according to claim 3, wherein the step of obtaining the corresponding data size according to the difference between the delay periods of the local audio data and the secondary audio data outputted from the local audio device and the secondary audio device further comprises:

determining whether the difference between the delay periods of the local audio data and the secondary audio data outputted from the local audio device and the secondary audio device is greater than a predetermined value; and when the difference between the delay periods of the local audio data and the secondary audio data outputted from the local audio device and the secondary audio device is greater than the predetermined value, obtaining the corresponding data size according to the difference between the delay periods of the local audio data and the secondary audio data outputted from the local audio device and the secondary audio device.

5. The method according to claim 1, wherein the audio and video playback device is a television or a television system consisting of a set-top box (STB) and a television, the local audio device is a local speaker built in the television, and the secondary audio device is an external acoustic enclosure connected to the television.

6. The method according to claim 5, wherein the secondary audio device and the television are connected by means of USB wireless connection.

7. An audio and video playback system, comprising:
an audio and video playback device, for playing multimedia data, the audio and video playback device comprising a local audio device, a processor, a memory and a buffer unit, wherein the audio and video playback device plays both audio and video; and
a secondary audio device, connected to the audio and video playback device; wherein the processor in the audio and video playback device performs steps of:
allocating a local audio buffer space and a secondary audio buffer space to the local audio device and the secondary audio device, respectively;
processing the obtained multimedia data to generate local audio data and secondary audio data;
writing the local audio data and the secondary audio data to the local audio buffer space and the secondary audio buffer space, respectively; and
reading the local audio data and the secondary audio data buffered in the local audio buffer space and the secondary audio buffer space to the local audio device and the secondary audio device, respectively, to have the local audio device and the secondary audio device simultaneously play the local audio data and the secondary audio data, respectively;
wherein, an audio device management program is stored in the memory of the audio and video playback device;
when the audio device management program is executed, the audio and video playback device controls the local audio device and the secondary audio device according to the audio device management program to perform a collaborated playback task to play audio data in the multimedia data;
wherein when the audio and video playback device controls the local audio device and the secondary audio device according to the audio device management program to perform the collaborated playback task to play audio data in the multimedia data;
wherein the local audio buffer space and the secondary audio buffer space are each a ring buffer space, such that while the local audio data and the secondary audio data buffered in the local audio buffer space and the secondary audio buffer space are read to the local audio device and the secondary audio device, the local audio data and the secondary audio data are continuously further written to the local audio buffer space and the secondary audio buffer space, respectively;
wherein when the audio and video playback controls the local audio device and the secondary audio device to collaboratively play the audio data in the multimedia data, the processor further performs steps of:

determining whether the local audio data and the secondary audio data outputted from the local audio device and the secondary audio device are synchronous;

when it is determined that the local audio data and the secondary audio data outputted from the local audio device and the secondary audio device are asynchronous, executing a synchronization mechanism to synchronize the local audio data and the secondary audio data outputted from the local audio device and the secondary audio device are synchronous;

wherein the step of determining whether the local audio data and the secondary audio data outputted from the local audio device and the secondary audio device are synchronous further comprises:

acquiring delay periods of the local audio data and the secondary audio data outputted from the local audio device and the secondary audio device, respectively; and determining, according to the respective delay periods of the local audio data and the secondary audio data outputted from the local audio device and the secondary audio device, whether the local audio data and the secondary audio data outputted from the local audio device and the secondary audio device are synchronous;

wherein the step of the step of executing the synchronization mechanism to synchronize the local audio data and the secondary audio data outputted from the local audio device and the secondary audio device further comprises:

determining a difference between the delay periods of the local audio data and the secondary audio data outputted from the local audio device and the secondary audio device;

generating a null packet having a corresponding size according to the difference between the delay periods of the local audio data and the secondary audio data outputted from the local audio device and the secondary audio device; and writing the null packet to the local audio buffer space or the secondary audio buffer space corresponding to the local audio device or the secondary audio device having the smaller delay period, to cause the local audio device or the secondary audio device to output the null packet when outputting the local audio data or the secondary audio data, thereby synchronizing the local audio data and the secondary audio data outputted from the local audio device and the secondary audio device.

8. An audio and video playback system, comprising:

an audio and video playback device, for playing multimedia data, the audio and video playback device comprising a local audio device, a processor, a memory and a buffer unit, wherein the audio and video playback device plays both audio and video; and a secondary audio device, connected to the audio and video playback device; wherein the processor in the audio and video playback device performs steps of:

allocating a local audio buffer space and a secondary audio buffer space to the local audio device and the secondary audio device, respectively;

processing the obtained multimedia data to generate local audio data and secondary audio data;

writing the local audio data and the secondary audio data to the local audio buffer space and the secondary audio buffer space, respectively; and reading the local audio data and the secondary audio data buffered in the local audio buffer space and the secondary audio buffer space to the local audio device and the secondary audio device, respectively, to have the local audio device and the secondary audio device simultaneously play the local audio data and the secondary audio data, respectively;

wherein, an audio device management program is stored in the memory of the audio and video playback device;

when the audio device management program is executed, the audio and video playback device controls the local audio device and the secondary audio device according to the audio device management program to perform a collaborated playback task to play audio data in the multimedia data;

wherein when the audio and video playback device controls the local audio device and the secondary audio device according to the audio device management program to perform the collaborated playback task to play audio data in the multimedia data;

wherein the local audio buffer space and the secondary audio buffer space are each a ring buffer space, such that while the local audio data and the secondary audio data buffered in the local audio buffer space and the secondary audio buffer space are read to the local audio device and the secondary audio device, the local audio data and the secondary audio data are continuously further written to the local audio buffer space and the secondary audio buffer space, respectively;

wherein when the audio and video playback controls the local audio device and the secondary audio device to collaboratively play the audio data in the multimedia data, the processor further performs steps of:

determining whether the local audio data and the secondary audio data outputted from the local audio device and the secondary audio device are synchronous;

when it is determined that the local audio data and the secondary audio data outputted from the local audio device and the secondary audio device are asynchronous, executing a synchronization mechanism to synchronize the local audio data and the secondary audio data outputted from the local audio device and the secondary audio device are synchronous;

wherein the step of determining whether the local audio data and the secondary audio data outputted from the local audio device and the secondary audio device are synchronous further comprises:

acquiring delay periods of the local audio data and the secondary audio data outputted from the local audio device and the secondary audio device, respectively; and determining, according to the respective delay periods of the local audio data and the secondary audio data outputted from the local audio device and the secondary audio device, whether the local audio data and the secondary audio data outputted from the local audio device and the secondary audio device are synchronous;

wherein the step of executing the synchronization mechanism to synchronize the local audio data and the secondary audio data outputted from the local audio device and the secondary audio device further comprises:

determining a difference between the delay periods of the local audio data and the secondary audio data outputted from the local audio device and the secondary audio device;

obtaining the corresponding data size according to the difference between the delay periods of the local audio data and the secondary audio data outputted from the local audio device and the secondary audio device; and discarding data having the corresponding data size from the local audio buffer space or the secondary audio buffer space corresponding to the local audio device or the secondary audio device having the greater delay period, thereby synchronizing the local audio data and the secondary audio data outputted from the local audio device and the secondary audio device.

9. The audio and video playback system according to claim 7, wherein the audio device management program further comprises an audio device playback mode selection function;

when the audio device playback mode selection function is executed, the audio and video playback device drives the local audio device and/or the secondary audio device according to the selected audio device playback mode to play the audio data in the multimedia data.

10. The audio and video playback system according to claim 7, wherein the audio and video playback device is a television or a television system consisting of a set-top box (STB) and a television, the local audio device is a local speaker built in the television, and the secondary audio device is an external acoustic enclosure connected to the television.

11. The audio and video playback system according to claim 7, wherein the secondary audio device and the television are connected by means of USB wireless connection.

* * * * *